(12) United States Patent
Übelacker et al.

(10) Patent No.: US 12,479,337 B2
(45) Date of Patent: Nov. 25, 2025

(54) SEAT ASSEMBLY FOR A MEANS OF PASSENGER TRANSPORT

(71) Applicant: GRAMMER Aktiengesellschaft, Ursensollen (DE)

(72) Inventors: Roland Übelacker, Pfreimd (DE); Thomas Hägler, Wernberg-Köblitz (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 385 days.

(21) Appl. No.: 18/363,970

(22) Filed: Aug. 2, 2023

(65) Prior Publication Data

US 2024/0051438 A1 Feb. 15, 2024

(30) Foreign Application Priority Data

Aug. 9, 2022 (DE) ...................... 10 2022 120 019.1

(51) Int. Cl.
| | |
|---|---|
| *B60N 2/90* | (2018.01) |
| *B60N 2/24* | (2006.01) |
| *B60N 2/64* | (2006.01) |
| *B60N 2/68* | (2006.01) |

(52) U.S. Cl.
CPC ............... *B60N 2/24* (2013.01); *B60N 2/646* (2013.01); *B60N 2/68* (2013.01); *B60N 2/90* (2018.02)

(58) Field of Classification Search
CPC ....................................................... B60N 2/90
See application file for complete search history.

(56) References Cited

U.S. PATENT DOCUMENTS

| | | | | |
|---|---|---|---|---|
| 782,823 | A | | 2/1905 | Budd |
| 2011/0057492 | A1 | * | 3/2011 | Nakamura ............... B60N 2/72 |
| | | | | 297/301.4 |

FOREIGN PATENT DOCUMENTS

| | | | | | |
|---|---|---|---|---|---|
| CN | 201296250 | | | 8/2009 | |
| CN | 213891634 | U | * | 8/2021 | |
| CZ | 38681 | U1 | * | 6/2025 | ............. B60N 2/879 |
| DE | 3637102 | A1 | * | 5/1988 | ........... F03G 7/0614 |
| DE | 102009037748 | | | 4/2011 | |
| EP | 4573974 | A1 | * | 6/2025 | ......... B64D 11/0647 |
| GB | 2569287 | A | * | 6/2019 | ............. B32B 27/00 |
| HR | P930158 | A2 | * | 4/1996 | |
| JP | 2020066414 | A | * | 4/2020 | |
| KR | 20160072666 | A | * | 6/2016 | ............... B60N 2/90 |
| KR | 20220000296 | U | * | 2/2022 | ............... B60N 2/90 |

OTHER PUBLICATIONS

Official Action for Germany Patent Application No. 102022120019.1, dated Mar. 21, 2023, 4 pages.
Extended European Search Report for Europe Patent Application No. 23189371, dated Dec. 12, 2023, 5 pages.

* cited by examiner

*Primary Examiner* — Timothy J Brindley
(74) *Attorney, Agent, or Firm* — Sheridan Ross P.C.

(57) ABSTRACT

The invention relates to a seat assembly for a means of passenger transport comprising a frame element on which a backrest element and a seat part are arranged, the seat assembly comprising at least one heat/fire shielding device which comprises at least one plate-like element, the at least one heat/fire shielding device being designed and provided in such a way that, when a source of heat and/or fire occurs, the plate-like element is displaced at least in sections towards the source of heat and/or fire or the plate-like element is deformed at least in sections towards the source of heat and/or fire.

10 Claims, 9 Drawing Sheets

SEAT ASSEMBLY FOR A MEANS OF PASSENGER TRANSPORT

CROSS REFERENCE TO RELATED APPLICATION

This application claims the benefit of German Patent Application No. 10 2022 120 019.1, filed Aug. 9, 2022, the contents of which are incorporated herein by reference in their entireties.

FIELD

The invention relates to a seat assembly for a passenger transport means comprising a frame element on which a backrest element and a seat part are arranged.

BACKGROUND

Such passenger transport means are, for example, rail vehicles such as trains, underground trains, trams etc. or buses. Fire protection in passenger transport means is particularly important. A source of heat and/or fire on the seat part of a passenger seat can cause major fires and thus lead to serious damage in the means of passenger transport and/or to hazards for passengers. In this context, the requirements for passenger seats have been further tightened in the European fire standard EN 45545 edition August 2020.

The object of the present invention is to provide a seat assembly which provides improved fire protection.

SUMMARY

The task is solved by a seat assembly which provides improved fire protection according to the features described herein.

The core idea of the invention is a seat assembly for a means of passenger transport comprising a frame element on which a backrest element and a seat part are arranged, wherein the seat assembly comprises at least one heat/fire shielding device which comprises at least one plate-like element, wherein the at least one heat/fire shielding device is designed and provided in such a way that, when a source of heat and/or fire occurs, an at least sectional displacement of the at least one plate-like element towards the source of heat and/or fire or an at least sectional deformation of the at least one plate-like element towards the source of heat and/or fire takes place.

By displacing or deforming the at least one plate-like element towards the source of heat and/or fire, the latter is at least partially covered from above by the at least one plate-like element. The at least one plate-like element thus serves as an effective heat/fire shield which effectively and easily contains or prevents the spread of the fire. Advantageously, a deformation is understood to be a bending of the at least one plate-like element towards the source of heat and/or fire.

It is advantageous that the at least one plate-like element is at least partially made of a fire resistant material and/or a metal.

The seat assembly extends along a height axis Z, a depth axis X and a width axis Y.

Often the source of heat and/or fire arises on the seat part of the seat assembly, for example triggered by carelessness or vandalism. Accordingly, it is advantageous that the at least one heat/fire shielding device is arranged along the height axis Z above the seat part. Accordingly, the at least one heat/fire shielding device is advantageously designed and provided in such a way that, if a source of heat and/or fire occurs on the seat part, the at least one plate-like element is at least partially displaced towards the seat part or the at least one plate-like element is at least partially deformed towards the seat part. However, it is also conceivable that the at least one heat/fire shielding device is located in another suitable (optimal) position in or on the seat assembly.

A source of heat or fire is thus shielded by the at least one heat/fire shielding device. This prevents the backrest of the seat assembly from catching fire. Furthermore, it is prevented that a fire spreads to the equipment of the passenger transport means above the seat assembly.

According to a particularly preferred embodiment, the at least one heat/fire shielding device is at least partially, preferably entirely, integrated in the backrest element. Advantageously, the at least one heat/fire shielding device is arranged in a lower section of the backrest element. Advantageously, the lower section essentially corresponds to the section of the backrest element provided for supporting the lumbar vertebrae region.

According to a further preferred embodiment, the backrest element comprises at least one cushioning layer. It is conceivable that only one or more cushioning layers are provided. Advantageously, a cover is also provided on the cushioning layer. Preferably, the at least one plate-like element is arranged within the at least one cushioning layer or along a depth axis (X) behind the at least one cushioning layer. Accordingly, it is conceivable that the at least one heat/fire shielding device or the at least one plate-like element is arranged within a cushioning element. However, it is also conceivable that at least one cushioning layer is provided along the depth axis X, i.e. between the occupant and the at least one plate-like element. Preferably, a cushioning layer can also be provided along the depth axis X behind the at least one plate-like element. Other intermediate layers between the cover and the cushioning layer and/or between the cushioning layer and the at least one heat/fire shielding device would also be conceivable. The at least one heat/fire shielding device therefore does not compromise the comfort of the occupant. Due to the at least one cushioning layer, the at least one plate-like element is hardly noticeable by the occupant.

According to an advantageous embodiment, it is provided that when a heat and/or fire source occurs, the stability of the at least one cushioning layer or further layers provided in front of the at least one plate-like element is initially weakened or damaged by the effect of the heat and/or fire. Due to this weakening or damage, these layers no longer prevent the displacement or deformation of the at least one plate-like element towards the heat and/or fire source. It is also conceivable that the cushioning layer and any further layers provided in front of the at least one plate-like element have predetermined breaking points which allow displacement or deformation when exposed to heat or fire. It is also conceivable that the cushioning layer and the optionally provided further layers in front of the at least one plate-like element have a recess in the area of the at least one plate-like element, wherein a separate cushioning layer or optionally provided further layers are arranged on the at least one plate-like element.

According to a further preferred embodiment, the frame element comprises two branch elements spaced apart along a wide axis (Y). Advantageously, the branch elements are essentially L-shaped. Advantageously, the branch elements can be arranged on the body of the means of passenger transport. Alternatively, the branch elements may be attached to a foot element or a seat substructure. The seat part and the backrest element are arranged on these branch elements.

The frame element may be intended for a single seat. Conceivably, the frame element could be part of a larger frame element that can provide, for example, a multi-seater or double-seater. The frame element may be made of a metal, a metal alloy or a plastic. Preferably, the frame element is made of aluminum, steel, magnesium or an alloy comprising at least one of these materials.

According to a further preferred embodiment, the at least one heat/fire shielding device comprises a storage device by means of which the at least one plate-like element is arranged on the frame element. Advantageously, the storage device extends between the branch elements of the frame element. Preferably, the at least one plate-like element is arranged centrally between the two branch elements. Advantageously, the storage device is rod-like.

According to a further preferred embodiment, the at least one plate-like element comprises at least one first section which deforms upon exposure to heat. Advantageously, the at least one first section is formed in such a way that the at least one plate-like element deforms towards the source of heat or fire when exposed to heat/fire. Preferably, the at least one first section is formed of thermobimetal. A thermobimetal usually consists of two superimposed layers of different metals. The two layers are connected to each other by a material bond or by a form-fit material. Due to different coefficients of thermal expansion of the metals used, one of the layers expands more than the other, causing the ensemble to deform or bend. Advantageously, the at least one first section is strip-like. Further advantageously, the at least one plate-like element has at least one second section disposed on the at least one first section. Preferably, the second section is arranged along the height axis above the first section. Advantageously, the second section may be made of a metal or a refractory material, for example a plastic. It is also conceivable that the at least one plate-like element comprises several first sections and/or several second sections. These are advantageously arranged one above the other along the height axis Z in such a way that a uniform deformation, or bending, takes place towards the source of heat or fire.

According to a further preferred embodiment, the at least one plate-like element is made entirely of thermobimetal. Preferably, the at least one plate-like element is designed in such a way that it deforms or bends towards the source of heat or fire when exposed to heat or fire.

According to a further preferred embodiment, the storage device comprises a pre-tensioning mechanism which provides a pre-tension for the at least one plate-like element against a portion of the backrest element. The at least one plate-like element is thus advantageously pressed against a portion of the backrest element with the pre-tension. Exposure to heat and/or fire causes at least a weakening of the stability of the portion of the backrest element, so that a displacement of the at least one plate-like element occurs due to the pre-tension. The section of the backrest element, or the cushioning layer, thus holds the at least one plate-like element in its basic position. In this basic position, the pre-tensioning mechanism provides a pre-tension. If a heat and/or fire source now occurs, preferably on the seat part, the section of the backrest element, thus the cushioning layer and possibly the cover and other layers, are damaged by its effect, so that the stability of the section of the backrest element is weakened. At a certain degree of weakening, the pre-tension is sufficient to drive the at least one plate-like element and thus cause a displacement of the at least one plate-like element towards the heat and/or fire source.

Pre-tensioning mechanism preferably comprises a torsion spring, also called a clock spring or leg spring. Preferably, two torsion springs are provided. Of course, other elements are also conceivable which can generate a pre-tension, for example compression springs or elastic elements.

According to a further embodiment, the at least one plate-like element may comprise at least one frame on which a covering is arranged. The covering preferably consists of a fire-resistant material and/or a "fireblocker". Fireblockers are flame-retardant fabric-like materials, for example nonwovens. The at least one frame may advantageously be a tubular frame or a frame made of struts. The at least one frame may preferably be made of a metal, for example steel. The at least one frame with the fire resistant covering may preferably be driven by the Pre-tensioning mechanism according to the aforementioned embodiment. However, the at least one frame with the refractory covering may also be used in combination with a thermobimetal strip. Accordingly, the at least one frame would be formed as a second section of the plate-like element.

According to a further embodiment, several heat/fire shielding devices are provided. Advantageously, these heat/fire shielding devices may comprise plate-like elements having different sizes. For example, along the depth axis (X) and/or along the height axis (Z) and/or along the width axis (Y), a plurality of heat/fire shielding devices of increasing size or increasing dimensions could be arranged one behind the other. The heat/fire shielding devices can be triggered by a predetermined sequence, i.e. the displacement or the deformation of the individual heat/fire shielding devices is predetermined in such a way that a fire spread can be specifically contained or controlled.

The object is further solved by a passenger transport means with a seat assembly according to one of the embodiments described above.

Further advantages, objectives and features of the present invention are explained with reference to the following description of the accompanying figures. Similar components may have the same reference signs in the various embodiments.

DETAILED DESCRIPTION

Figure 13:
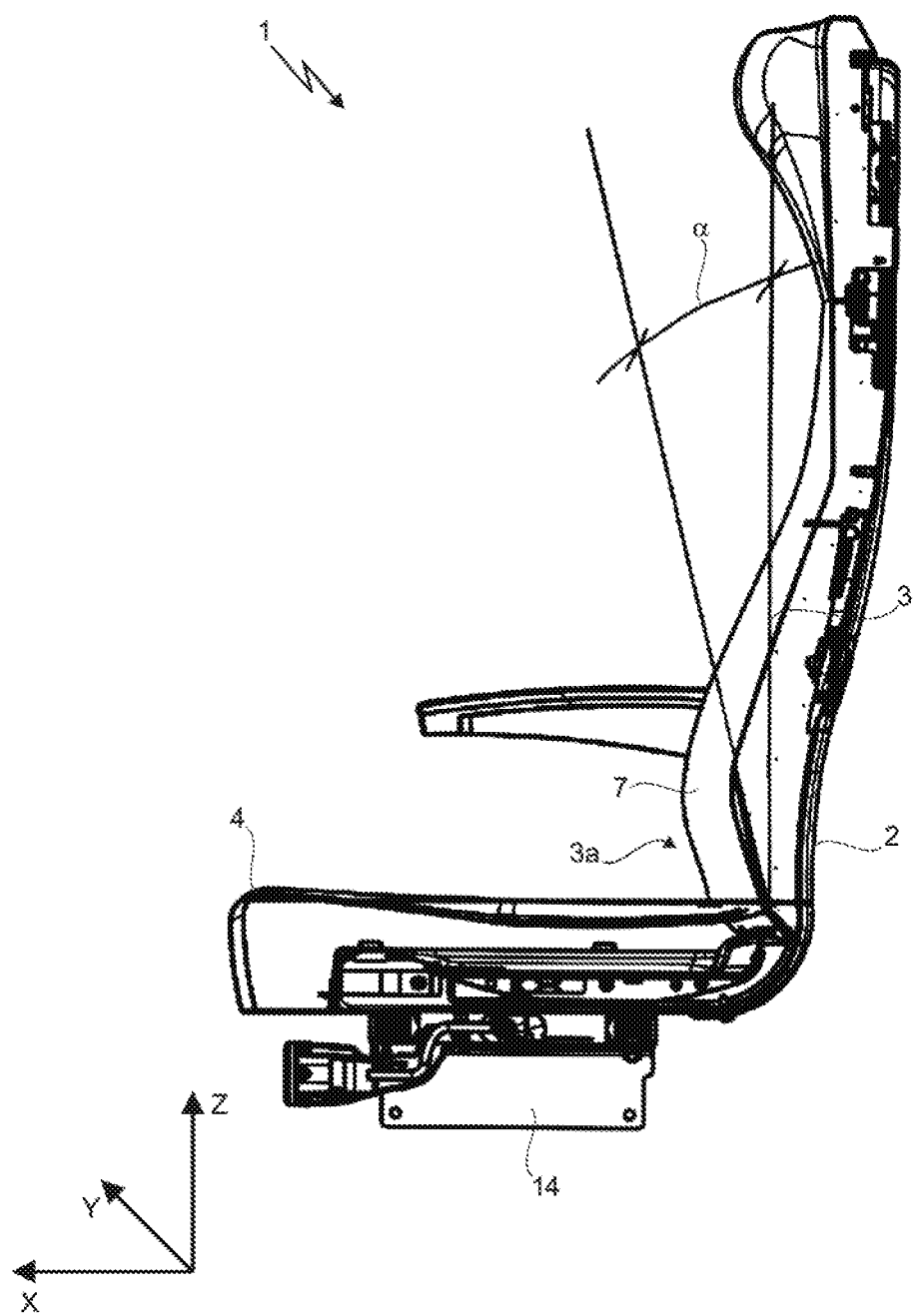
FIG. 13 a side sectional view of the seat assembly with a Heat/fire shielding device.
Figure 14:
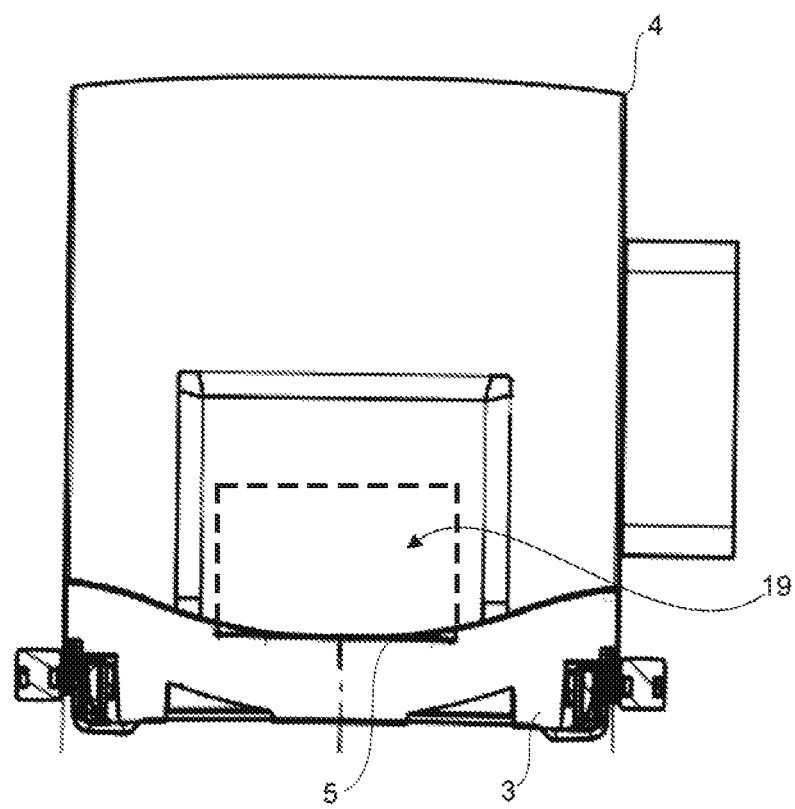
FIG. 14 a top sectional view of the seat assembly with a Heat/fire shielding device.

FIGS. 13 and 14 show a seat assembly 1 for a means of passenger transport comprising a frame element 2 on which a backrest element 3 and a seat part 4 are arranged, wherein the seat assembly 1 comprises at least one heat/fire shielding device 5 which comprises at least one plate-like element 6, wherein the heat/fire shielding device 5 is designed and provided in such a way that, when a heat and/or fire source occurs, an at least sectional displacement of the at least one plate-like element 6 towards the heat and/or fire source or an at least sectional deformation of the at least one plate-like element 6 towards the heat and/or fire source takes place.

The seat assembly 1 extends along a height axis Z, a depth axis X and a width axis Y.

FIGS. 1 to 5 show a frame element 2 which represents a heat/fire shielding device 5 according to a first embodiment. This heat/fire shielding device 5 is designed and intended in such a way that, when a source of heat and/or fire occurs, the plate-like element 6 is at least partially displaced towards the source of heat and/or fire. Only a heat/fire shielding device 5 with a plate-like element is shown here, but this is not intended as a restriction of the general public.

FIGS. 6 to 10 show a frame element 2 which represents a heat/fire shielding device 5 according to a first embodiment. This heat/fire shielding device 5 is designed and intended in such a way that, when a source of heat and/or fire occurs, at least a sectional deformation, in particular a bending of the plate-like element 6 towards the source of heat and/or fire, takes place.

First, the features that are common to both embodiments are described.

FIG. 13 shows that the Heat/fire shielding device 5 is at least partially integrated into the backrest element 3 and is arranged in a lower section 3a of the backrest element 3. The backrest element 3 comprises at least one cushioning layer 7, wherein the at least one plate-like element 6 is arranged within the at least one cushioning layer 7 or along a depth axis X behind the at least one cushioning layer 7. Furthermore, a cover can be provided on the cushioning layer 7. Furthermore, it is conceivable that further intermediate layers are provided. The heat/fire shielding device 5 is therefore neither visible nor perceptible to an occupant in the normal state. Furthermore, it can be seen from the figures that the plate-like element 6 is arranged at an incline. The plate-like element 6 encloses an angle α with an axis which is parallel to the height axis Z. The angle α is preferably in a range between 5° and 30°, more preferably in a range between 10° and 20°. The angle α is preferably in an area between 5° and 30°, more preferably in an area between 10° and 20°, more preferably in an area between 12° and 18°.

FIGS. 1 to 10 show that the frame element 2 comprises two branch elements 8 spaced apart along a wide axis Y. The branch elements 8 can be mounted directly on the passenger transport vehicle or on a base or substructure 14. The branch elements 8 can be mounted directly on the passenger transport means or on a base or a base 14. FIG. 13 shows a corresponding base 14 on which the frame element 2 is arranged. Such a base 14 can also include, for example, a displacement device by means of which the seat assembly 1 can be displaced along the depth axis X. The frame element 2 can also be a part of a larger frame, for example a frame that provides a two-seater.

The branch elements 8 are essentially L-shaped. Accordingly, the branch elements 8 comprise a first section 8a, which extends essentially along the depth axis X. Furthermore, the branch elements 8 comprise a second section 8b which extends substantially along the height axis Z. The first section 8a is connected to the second section 8b by means of a curved transition section 8c. The backrest element 3 or a frame element 2 of the backrest element 3 can be attached to the second section 8b.

The heat/fire shielding device 5 comprises a storage device 9 by means of which the at least one plate-like element 6 is arranged on the frame element 2. However, it is also conceivable that the storage device 9 is attached to the base 14. FIGS. 1 to 10 show an embodiment of a storage device 9. Here it can be seen that the storage device 9 extends between the branch elements 8. The storage device 9 comprises a bar-shaped element 9a, which is mounted and/or fixed in a bore of the branch elements 8. In particular, the bar-shaped element 9a is arranged in the transition section 8c of the respective branch elements 8. Preferably, the bar-shaped element 9a is arranged along the height axis Z substantially at the height of the seat part 4 or along the height axis Z above the seat part 4. Of course, the storage device 9 can also be mounted and/or fixed at another position on the branch elements 8. FIGS. 1 to 10 further show that the bar-shaped element 9a passes through a branch element 8 and is arranged in a protection scheme 15. The bar-shaped element 9a opens into a strip element of the protection scheme 15, which in turn is arranged with a further bar on the branch element 8 above the said bore.

Figure 12:
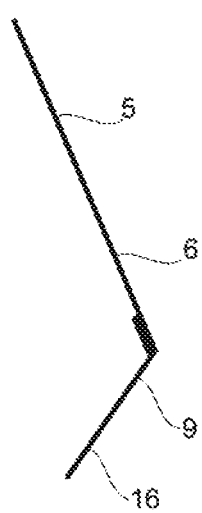
FIG. 12 a sectional view of a heat/fire shielding device according to a further embodiment.

FIG. 12 shows an alternative storage device 9. The storage device 9 comprises an angular retaining element 16, to which the plate-like element 6 is arranged or attached.

The at least one plate-like element 6 is preferably arranged centrally between the two branch elements 8. Furthermore, the plate-like element 6 may have an advantageous width in an area between 15 cm and 35 cm, more preferably between 18 cm and 22 cm. Furthermore, the plate-like element 6 may have an advantageous height in an area between 10 cm and 40 cm, more preferably between 15 cm and 20 cm.

According to the embodiment shown in FIGS. 1 to 5, the storage device 9 comprises a pre-tensioning mechanism 12 which provides a pre-tension for the plate-like element 6 against a portion of the backrest element 3. The corresponding portion of the backrest element 3 is not shown in the figures. The portion of the backrest element 3 is the cushioning layer 7, which is shown for example in FIG. 13. This section of the backrest element 3 holds the plate-like element 6 in its basic position, as shown in FIGS. 1 to 5. In the event of heat and/or fire, for example on the seat part 4, the section of the backrest element 3 is damaged or its stability weakened. After exceeding a certain degree of this weakening, the plate-like element 6 can be moved towards the seat part 4, driven by the pre-tensioning mechanism 12.

The pre-tensioning mechanism 12 comprises at least one torsion-spring element 13. The pre-tensioning mechanism 12 comprises two Torsion-spring elements 13. The bar-shaped element 9a is rotatably mounted on the leg elements 8. In particular, the bar-shaped element 9a is rotatably mounted in through holes of the branch elements 8. The at least one or the two torsion-spring elements 13 are connected to the bar-shaped element 9a and one branch element 8 each in such a way that a rotation of the bar-shaped element 9a is pretensioned by the torsion-spring element 13.

Figure 1:
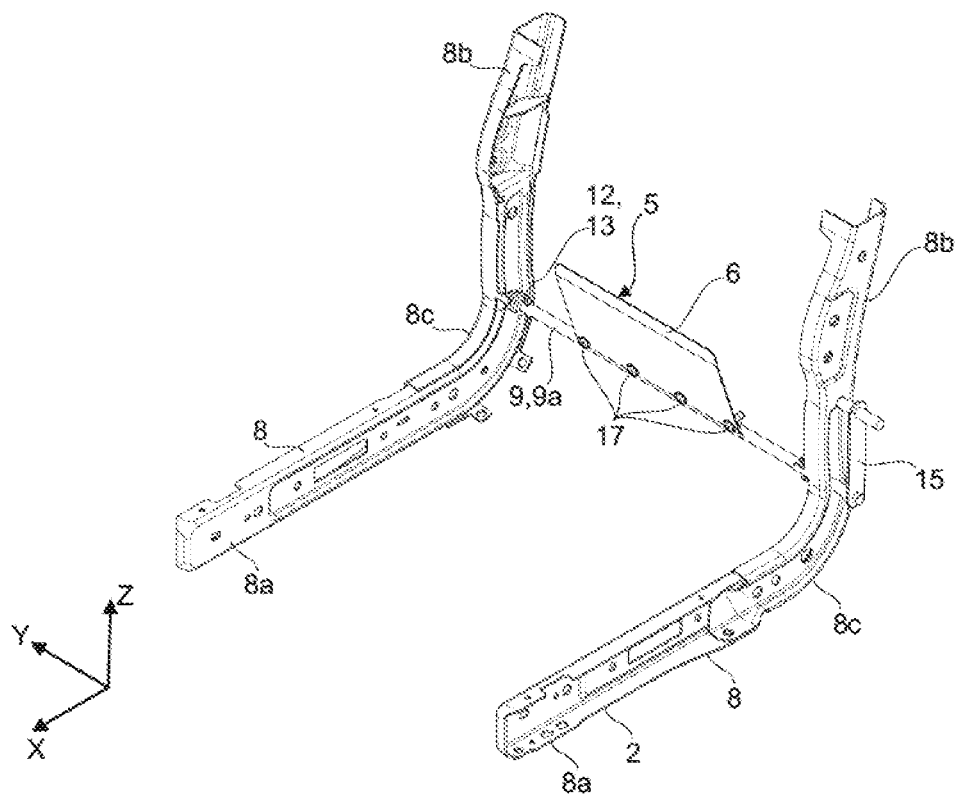
FIG. 1 a perspective view of the frame element with a Heat/fire shielding device according to one embodiment.
Figure 2:
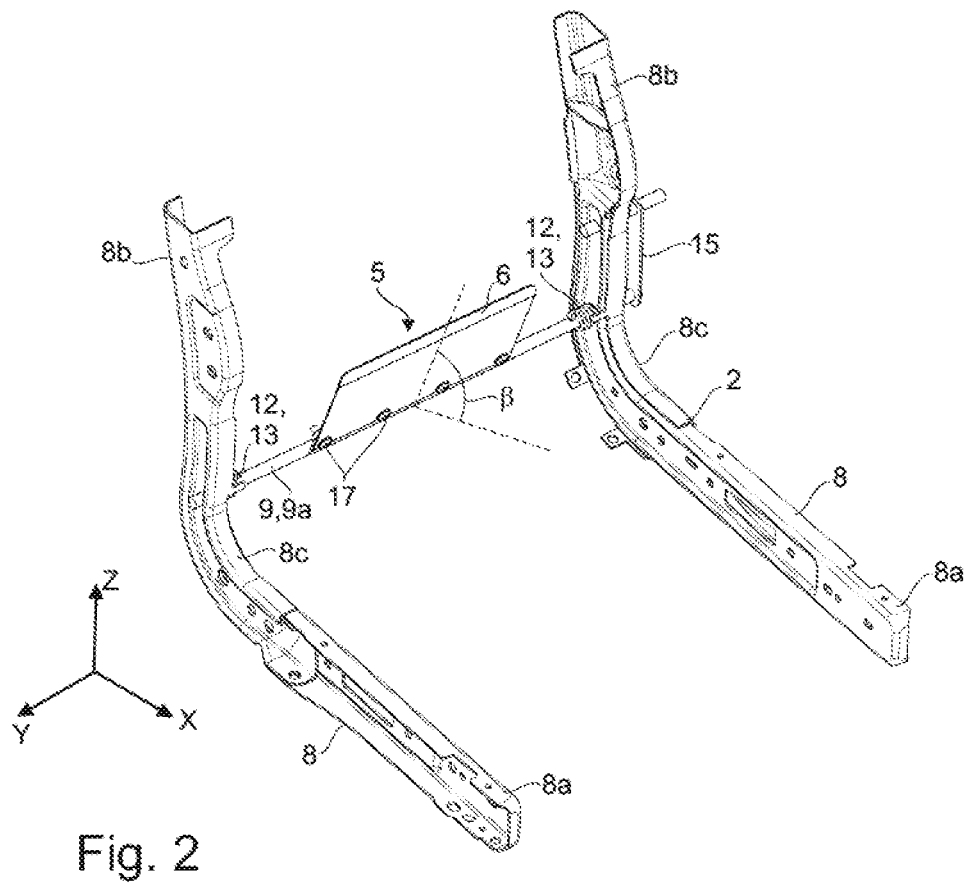
FIG. 2 a perspective view of the frame element with a Heat/fire shielding device according to one embodiment.
Figure 3:
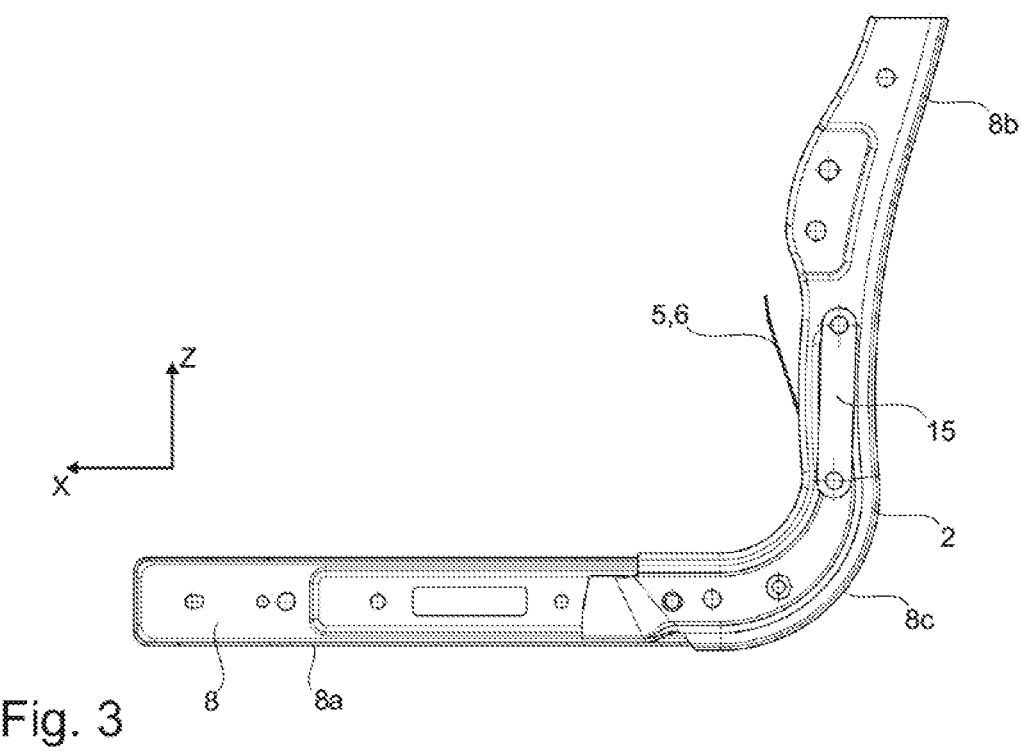
FIG. 3 a side view of the frame element with a Heat/fire shielding device according to one embodiment.
Figure 4:
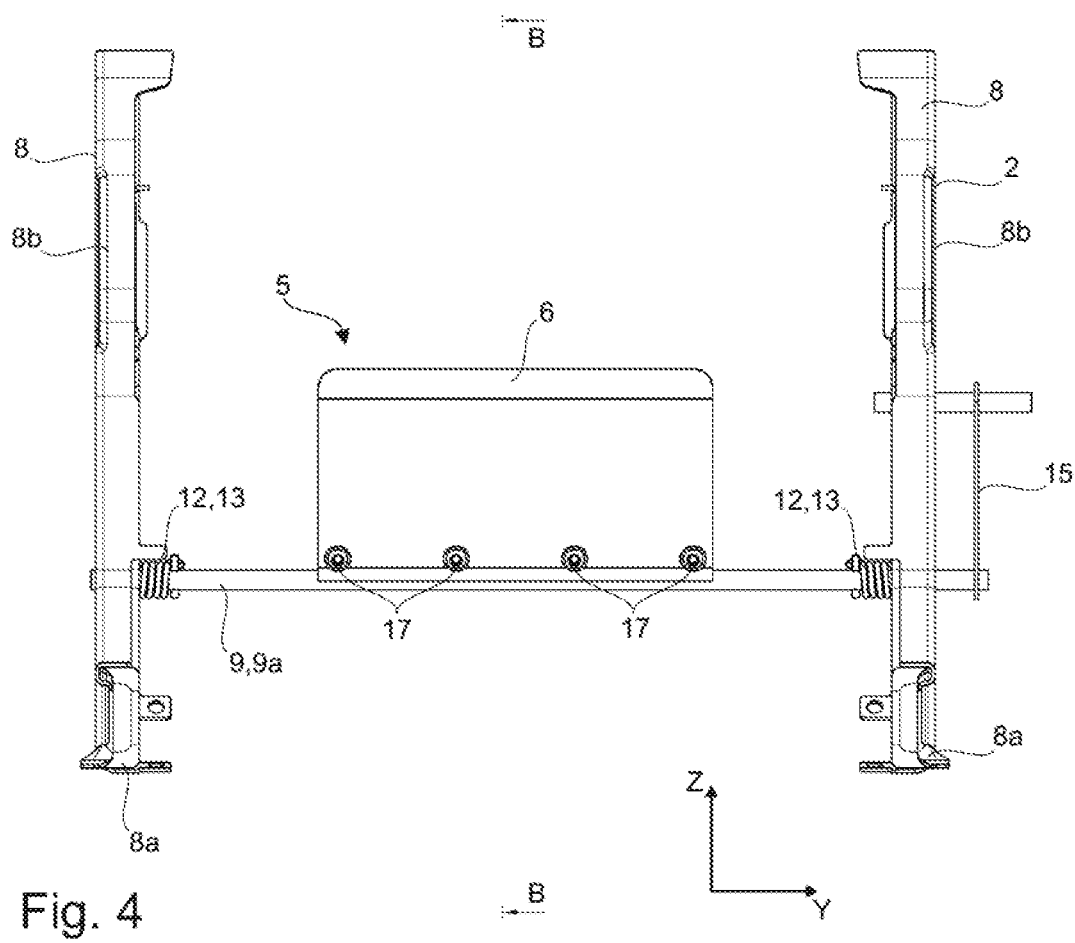
FIG. 4 a front view of the frame element with a Heat/fire shielding device according to one embodiment.
Figure 5:
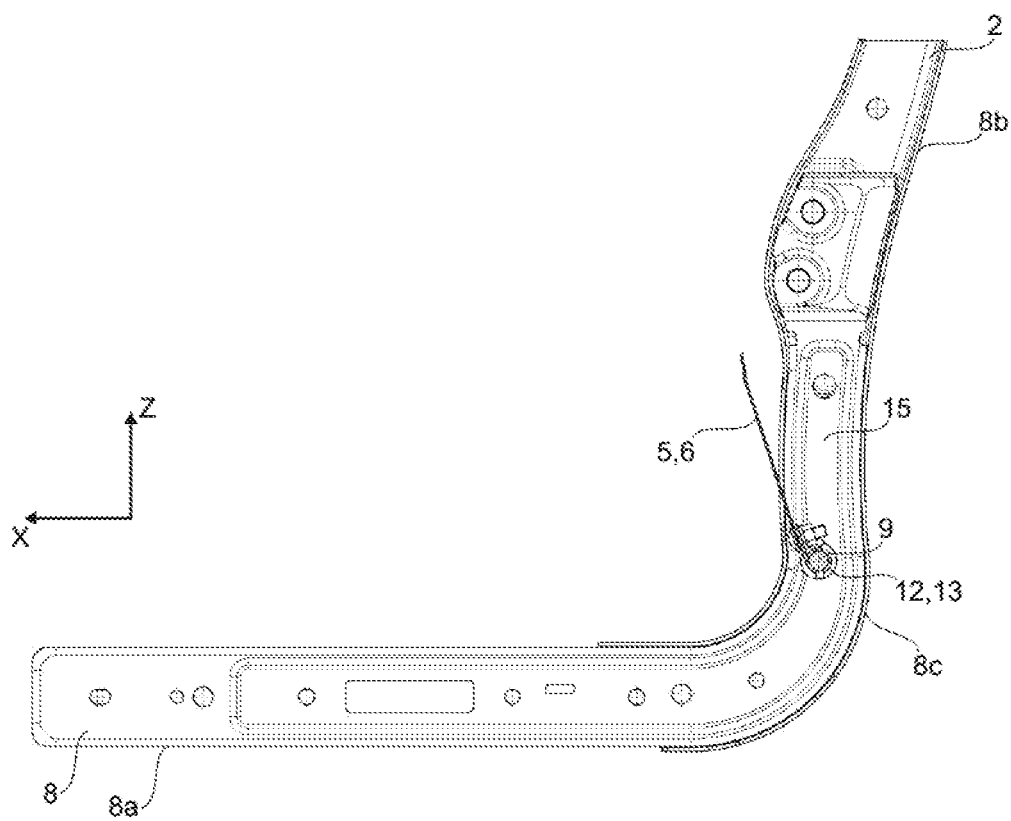
FIG. 5 a sectional view of the frame element with a Heat/fire shielding device according to one embodiment.
Figure 6:
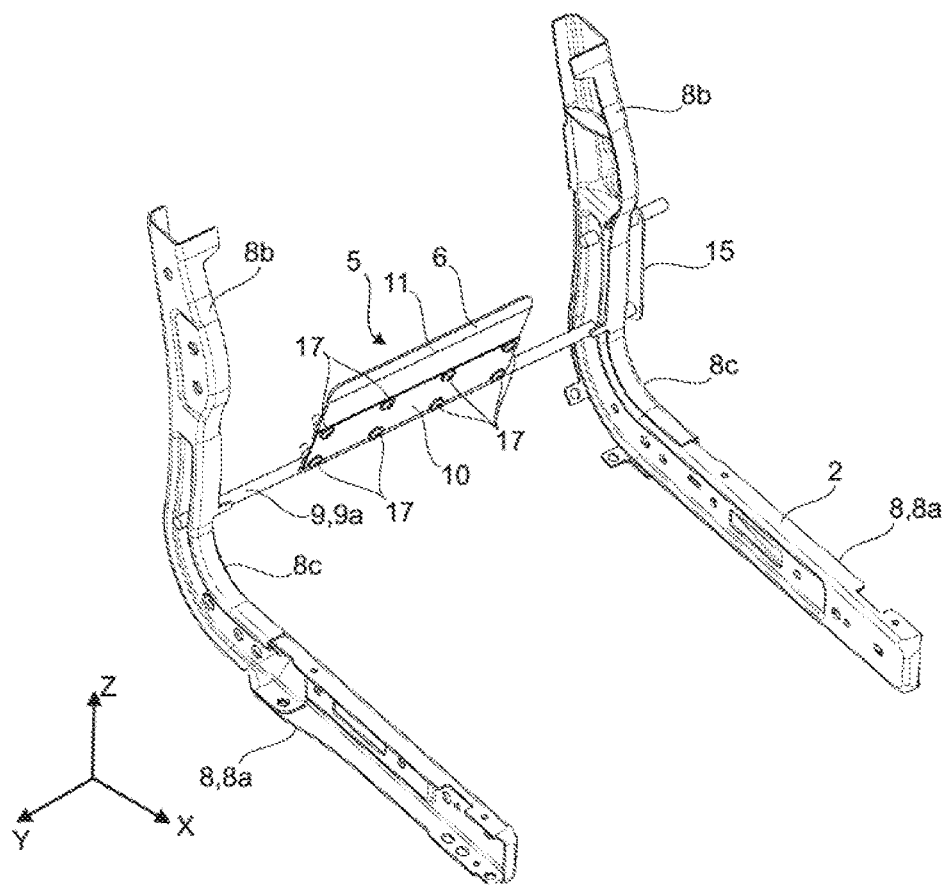
FIG. 6 a perspective view of the frame element with a heat/fire shielding device according to a further embodiment.
Figure 7:
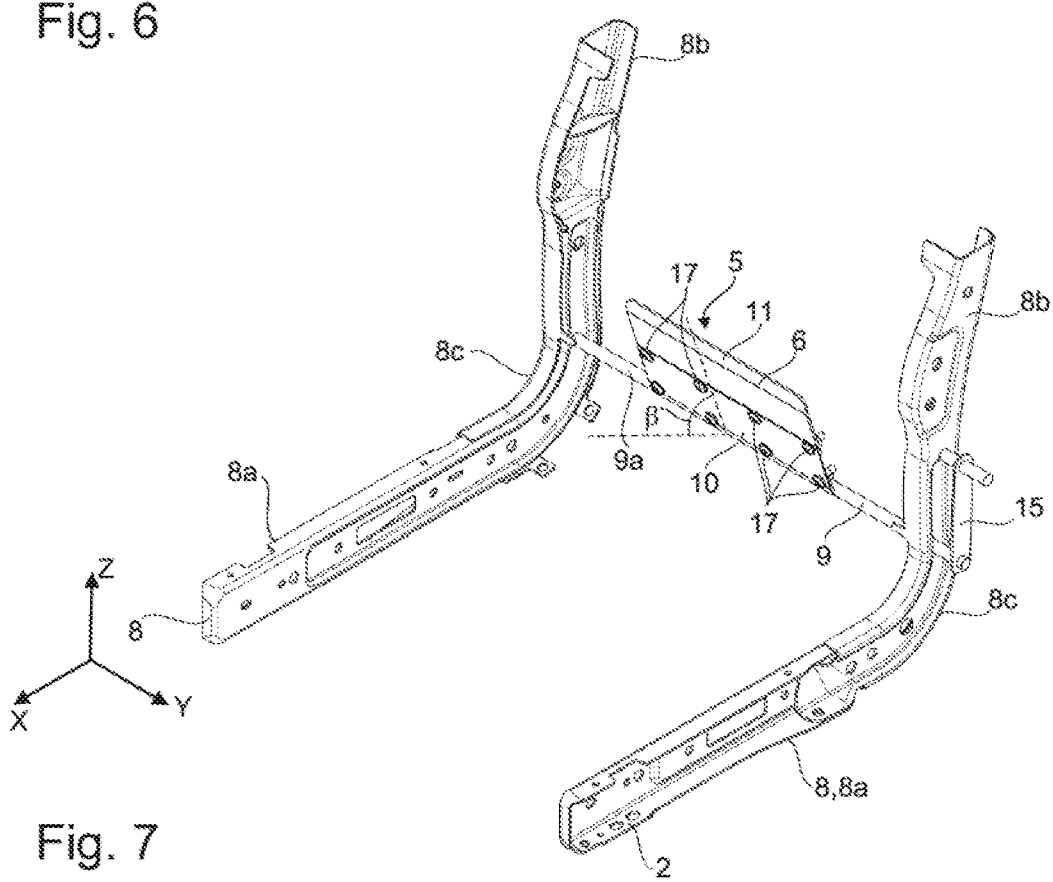
FIG. 7 a perspective view of the frame element with a heat/fire shielding device according to a further embodiment.
Figure 8:
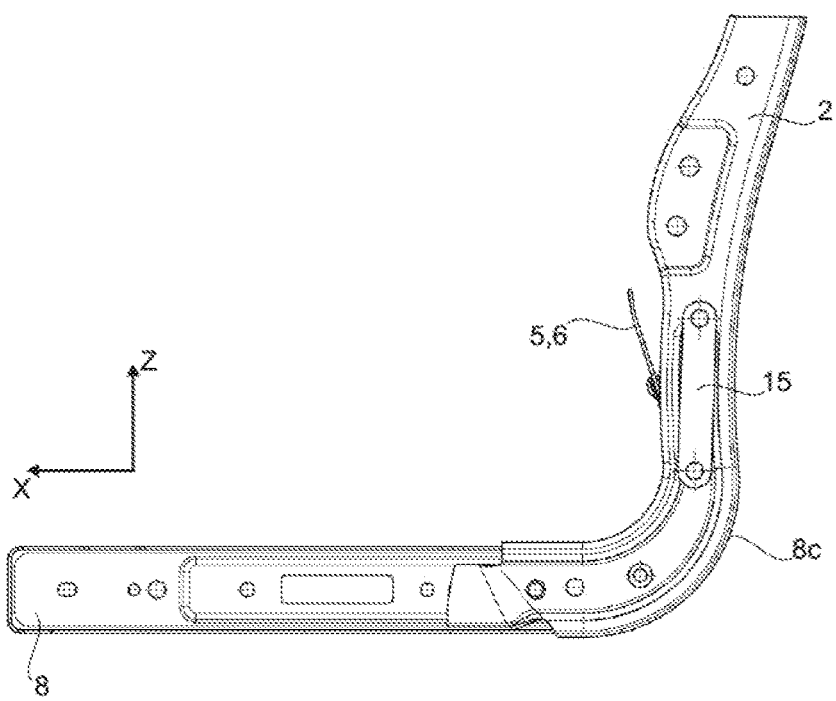
FIG. 8 a side view of the frame element with a Heat/fire shielding device according to a further embodiment.
Figure 9:
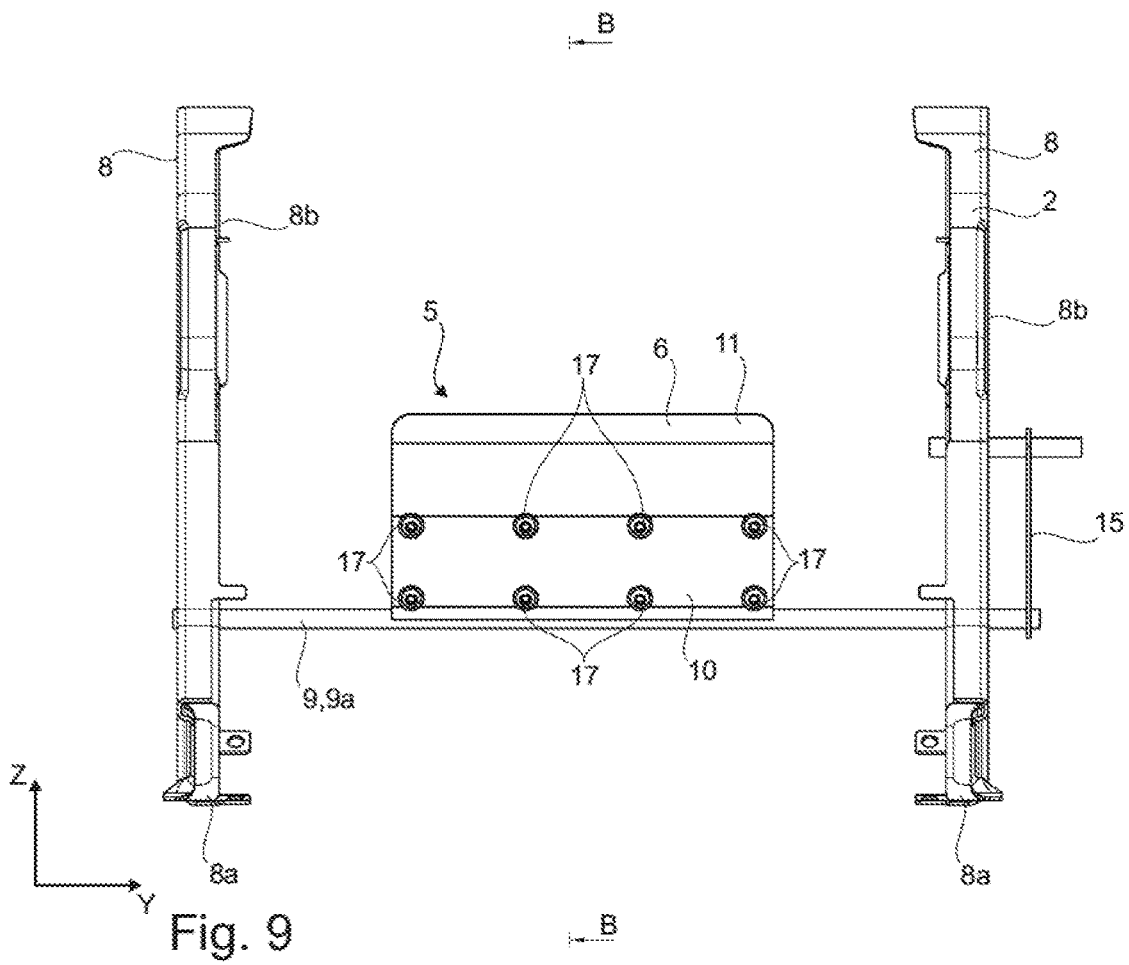
FIG. 9 a front view of the frame element with a Heat/fire shielding device according to a further embodiment.
Figure 10:
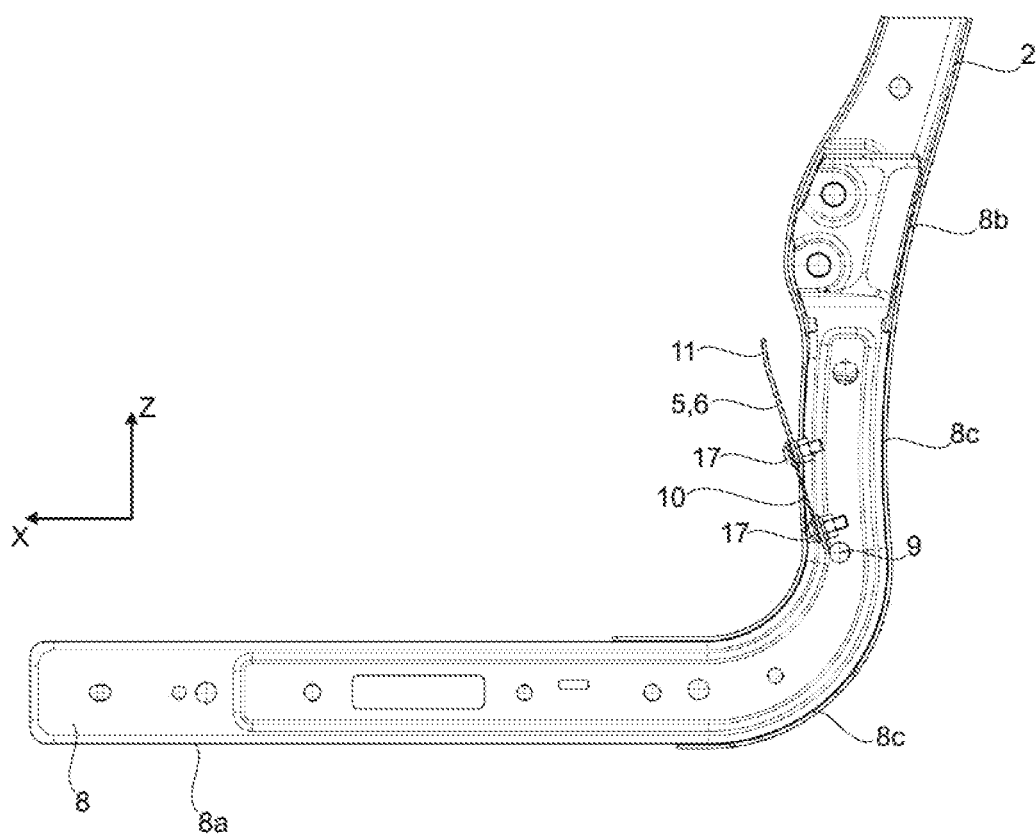
FIG. 10 a sectional view of the frame element with a Heat/fire shielding device according to a further embodiment.

The plate-like element 6 is fastened to the bar-shaped element by at least one fastener 17, for example screws or rivets. When the bar-shaped element 9a is rotated, the plate-like element 6 is rotated by an angle (3, as shown in FIG. 2. The plate-like element 6 is thus moved or rotated towards the source of heat and/or fire. The plate-like element 6 can, for example, be formed as a metal sheet with a thickness in an area between 0.5 mm and 2.5 mm, preferably 0.8 mm to 1.2 mm.

According to the embodiment shown in FIGS. 6 to 10, the plate-like element 6 has at least one first section 10 which deforms when exposed to heat. The first section 10 is designed in such a way that the plate-like element 6 deforms towards the source of heat or fire. In the present case, the at least one first section 10 is made of thermobimetal. Furthermore, the at least one first section 10 is formed in a strip-like manner. Furthermore, the plate-like element 6 has at least one second section 11 which is arranged on the at least one first section 10. When exposed to heat above a predetermined threshold value, the plate-like element 6 is thus deformed at least in sections towards the seat part 4.

Only one strip-like first section is provided. Of course, it is also conceivable that several such strip-like first sections 10 are provided. The strip-like first section 10 extends over the entire length of the plate-like element 6.

The bar-shaped element 9a is preferably fixed, i.e. not rotatable, to the branch elements 8. The plate-like element 6 is attached to the bar-shaped element 9a by means of fastening means 17. The second section 11 is arranged along the height axis Z above the first section 10. The second section 11 is arranged on the first section 10 by means of fasteners 17, for example screws or rivets. Instead of using fasteners 17, however, it is also conceivable to use other connections, such as adhesive connections. The first section 10 is thus arranged between the bar-shaped element 9a and the second section 11. However, it is also conceivable that several strip-shaped first sections 10 made of thermobimetal and, if necessary, several second sections 11 are provided, which are arranged in such a way that a uniform deformation or bending towards the heat/fire source can take place.

Figure 11:
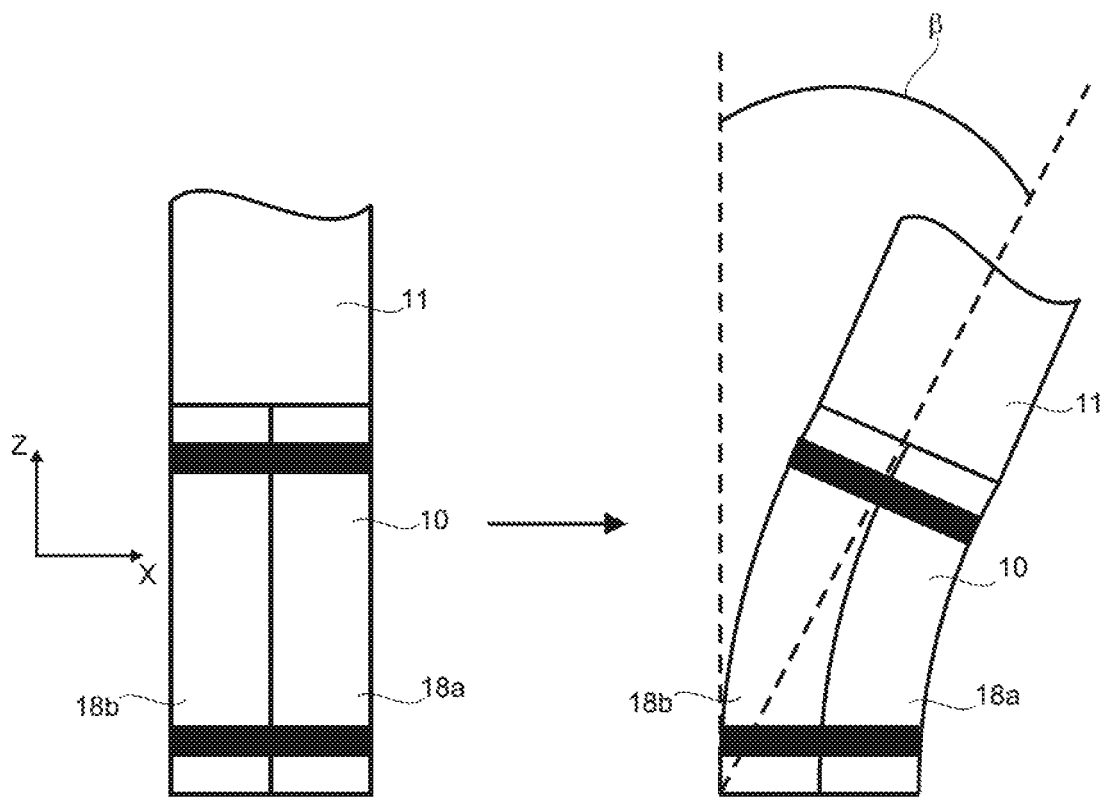
FIG. 11 Principle sketch of the deformation of the plate-like element.

The deformation of the plate-like element 6, when exposed to heat/fire, is in this case a bending movement of the first section 11, as shown in FIG. 11, the thermobimetal consists of two materials with different coefficients of expansion. In FIG. 11, the first section 10 is shown with the first material 18a and the second material 18b. The second section 11 of the plate-like element 6 is arranged on the first section 10. The left-hand illustration in FIG. 11 shows the basic position of the plate-like element 6. When exposed to heat, the first section 11 bends towards the seat part 4. This can be seen in the right-hand illustration in FIG. 11. Due to the bending, the plate-like element 6 is partially displaced by an angle β towards the seat part. Here, too, a section of the backrest element 3 is advantageously already damaged or its stability weakened by the effect of heat or fire. Here, too, there is a movement through an angle β towards the source of the heat/fire or the seat part 4.

According to a further embodiment not shown, the plate-like element 6 can be made entirely of thermobimetal. In this case, the plate-like element 6 is designed in such a way that it deforms or bends towards the source of heat or fire or the seat part 4 when exposed to heat or fire.

FIG. 14 shows a top view of the seat part 4 and the heat/fire shielding device 5. An area 19 is marked within which a heat/fire source can be shielded by the heat/fire shielding device 5. This area is the most likely one in which a heat/fire source occurs.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS

1 Seat assembly
2 Frame element
3 Backrest element
3a Lower section of the backrest element
4 Seat part
5 Heat/fire shielding device
6 Plate-like element
7 Cushioning layer
8 Branch elements
8a first section of the branch elements
8b second section of the branch elements
8c Transition section of the branch elements
9 Storage device
9a Bar-shaped element
10 first section of the plate-like element
11 second section of the plate-like element
12 Pre-tensioning mechanism
13 Torsion-spring element
14 Base
15 Protection scheme
16 Retaining element
17 Fasteners
18a first material
18b Second material
19 Area
α Angle
β Angle
X Depth axis
Y Wide axis
Z Height axis

What is claimed is:

1. A seat assembly for a means of passenger transport comprising a frame element, on which a backrest element and a seat part are arranged,
wherein
the seat assembly comprises at least one heat/fire shielding device, which comprises at least one plate-like element, the at least one heat/fire shielding device being designed and provided therefor, that upon occurrence of a heat and/or fire source an at least sectional displacement of the at least one plate-like element towards the heat and/or or fire source or an at least sectional deformation of the at least one plate-like element towards the heat and/or fire source takes place.

2. The seat assembly according to claim 1,
wherein said at least one plate-like element is at least made of a fire resistant material and/or a metal, wherein said at least one heat/fire shielding device is at least partially integrated in said backrest element, said at least one heat/fire shielding device being arranged in a lower portion of said backrest element.

3. The seat assembly according to claim 1, wherein
the backrest element comprises at least one cushioning layer, wherein the at least one plate-like element is arranged within the at least one cushioning layer or along a depth axis (X) behind the at least one cushioning layer.

4. The seat assembly according to claim 1, wherein
the frame element comprises two branch elements spaced apart along a wide axis (Y), the branch elements being substantially L-shaped.

5. The seat assembly according to claim 4, wherein
the at least one heat/fire shielding device comprises a storage device by means of which the at least one plate-like element is arranged on the frame element, wherein the storage device extends between the branch elements, wherein the at least one plate-like element is arranged centrally between the two branch elements.

6. The seat assembly according to claim 1, wherein
the at least one plate-like element has at least one first section which deforms upon exposure to heat, wherein the first section is formed such that upon exposure to heat/fire the plate-like element deforms towards the source of heat or fire, wherein said at least one first section is formed of thermobimetal, said at least one first section being strip-like, said at least one plate-like element having at least one second section disposed on said at least one first section.

7. The seat assembly according to claim 1, wherein
said at least one plate-like element is formed entirely of thermobimetal, said at least one plate-like element being formed such that upon exposure to heat/fire it deforms towards the source of heat or fire.

8. The seat assembly according to claim 6, wherein
said storage device comprises a pre-tensioning mechanism providing a pre-tension for said at least one plate-like element against a portion of said backrest element, said portion of said backrest element being a cushioning layer, wherein exposure to heat and/or fire causes at least a weakening of the stability of said portion of said backrest element such that a displacement of said at least one plate-like element occurs due to said pre-tension.

9. The seat assembly according to claim 8, wherein
the pre-tensioning mechanism comprises at least one torsion-spring element.

10. The passenger transport means with a seat assembly according to claim 1.

* * * * *